(12) United States Patent
Murayama et al.

(10) Patent No.: US 9,421,957 B2
(45) Date of Patent: Aug. 23, 2016

(54) BRAKING DEVICE

(71) Applicants: HONDA MOTOR CO., LTD., Minato-ku, Tokyo (JP); NISSIN KOGYO CO., LTD., Ueda-shi, Nagano (JP)

(72) Inventors: Kazuaki Murayama, Wako (JP); Jiro Suzuki, Wako (JP); Makoto Sawai, Wako (JP); Takaaki Ohnishi, Wako (JP); Nobuyuki Kobayashi, Ueda (JP); Motoyasu Nakamura, Ueda (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 75 days.

(21) Appl. No.: 14/388,878

(22) PCT Filed: Mar. 29, 2013

(86) PCT No.: PCT/JP2013/059723
§ 371 (c)(1),
(2) Date: Sep. 29, 2014

(87) PCT Pub. No.: WO2013/147252
PCT Pub. Date: Oct. 3, 2013

(65) Prior Publication Data
US 2015/0061363 A1 Mar. 5, 2015

(30) Foreign Application Priority Data
Mar. 30, 2012 (JP) ................................. 2012-083311

(51) Int. Cl.
*B60T 13/58* (2006.01)
*B60T 8/17* (2006.01)
(Continued)

(52) U.S. Cl.
CPC .............. *B60T 13/588* (2013.01); *B60T 7/042* (2013.01); *B60T 8/17* (2013.01); *B60T 8/38* (2013.01);
(Continued)

(58) Field of Classification Search
CPC .... B60T 13/588; B60T 13/74; B60T 13/745; B60T 13/68; B60T 13/686; B60T 13/662; B60T 13/146; B60T 8/17; B60T 8/38; B60T 8/4081; B60T 7/042
See application file for complete search history.

(56) References Cited

U.S. PATENT DOCUMENTS 6,033,036 A 3/2000 Ruffer et al.
2008/0290726 A1* 11/2008 Inoue et al. .................... 303/15
(Continued)

FOREIGN PATENT DOCUMENTS

CN 1374218 A 10/2002
GB 1 354 987 A 5/1974
(Continued)

OTHER PUBLICATIONS

Office Action issued in the corresponding Chinese Patent Application 201380017426.1 and dated Jan. 25, 2016.
(Continued)

*Primary Examiner* — Vishal Sahni
(74) *Attorney, Agent, or Firm* — Carrier Blackman & Associates, P.C.; Joseph P. Carrier; William D. Blackman (57) ABSTRACT

A braking device includes a guide piston which surrounds the outer periphery of a rod part of a second slave piston, a cup seal which is mounted on the second slave piston, and a seal member which is provided on the guide piston. The second slave piston includes an enlarged diameter portion which comes into contact with an axial-direction surface of the guide piston when the second slave piston is in the initial position, and the enlarged diameter portion is provided with a cut-out section which extends in the internal diameter direction of the second slave piston.

4 Claims, 9 Drawing Sheets

(51) Int. Cl.
- *B60T 13/66* (2006.01)
- *B60T 13/68* (2006.01)
- *B60T 13/74* (2006.01)
- *B60T 8/38* (2006.01)
- *B60T 8/40* (2006.01)
- *B60T 7/04* (2006.01)
- *B60T 13/14* (2006.01)
- *B60T 11/236* (2006.01)

(52) U.S. Cl.
CPC ............ *B60T 8/4081* (2013.01); *B60T 11/236* (2013.01); *B60T 13/146* (2013.01); *B60T 13/662* (2013.01); *B60T 13/686* (2013.01); *B60T 13/74* (2013.01); *B60T 13/745* (2013.01)

(56) References Cited

U.S. PATENT DOCUMENTS

2012/0248862 A1* 10/2012 Ohnishi et al. ................. 303/20
2014/0319903 A1* 10/2014 Murayama et al. ............ 303/15

FOREIGN PATENT DOCUMENTS

| | | |
|---|---|---|
| JP | 2004-142602 A | 5/2004 |
| JP | 2008-143419 A | 6/2008 |
| JP | 2012-214118 A | 11/2012 |

OTHER PUBLICATIONS extended European search report issued in the corresponding European Application 13 769 453.5 and dated Jan. 21, 2016.

* cited by examiner

BRAKING DEVICE

TECHNICAL FIELD

The present invention relates to a braking device that is installed, for example, in a brake system for a vehicle.

BACKGROUND ART

Conventionally, braking equipment for a vehicle is known that is provided with a master cylinder of tandem type in which one master piston and the other master piston are arranged in series in a cylinder body with a pressurizing chamber therebetween (see, for example, Patent literature 1). The master cylinder disclosed in this Patent literature 1 is provided with a seal member that is provided on the master piston in the backward side and slides in contact with the inner periphery of the cylinder bore to seal the pressurizing chamber, and a guide piston having a seal member that seals an opening section of the cylinder body of the master cylinder.

CITATION LIST

Patent Literature

Patent Literature 1: Japanese Patent Application Publication No. 2004-142602 (see FIG. 2)

SUMMARY OF INVENTION

Technical Problem

Incidentally, a system such as a slave cylinder is known, for example, which causes a slave piston to move forward and backward through a rotary driving force of a motor or the like, so as to generate a brake hydraulic pressure (slave cylinder output) higher than a brake hydraulic pressure of the master cylinder (master cylinder output) to transmit the generated brake hydraulic pressure to caliper cylinders on the brake side. In such a system, when the slave piston arranged in the slave cylinder is displaced to abut against a guide piston which surrounds the outer periphery of the slave piston, stiction may be caused between the slave piston and the guide piston.

Moreover, if air-bleeding from brake fluid (brake liquid) filled in the slave cylinder is performed, for example, without operation of the slave cylinder when an ignition switch is in the off state, air (air contained in the brake fluid) may remain between the slave piston and the guide piston.

The present invention has been made to solve the above problems, and an object thereof is to provide a braking device that can avoid stiction between a slave piston and a guide piston and eliminate air remaining between the slave piston and the guide piston.

Solution to Problem

In order to attain the above object, the present invention provides a braking device including: a master cylinder that generates a brake hydraulic pressure by operation of a brake operation unit; a slave cylinder that displaces a slave piston by an electric motor which is driven in response to operation amount of the brake operation unit and generates a brake hydraulic pressure, and has a slave cylinder body provided with an opening section into which the slave piston can be inserted from outside; a guide piston that blocks the opening section of the slave cylinder body and surrounds an outer periphery of the slave piston; a first seal member that is provided on the slave piston and seals in sliding contact with an inside wall of the slave cylinder body; and a second seal member that is provided on the guide piston and seals in abutment against the inside wall of the slave cylinder body, wherein the slave piston includes an enlarged diameter portion which comes into contact with an axial-direction surface of the guide piston when the slave piston is in an initial position, and at least one of the enlarged diameter portion of the slave piston and the axial-direction surface of the guide piston is provided with a cut-out section which extends in an internal diameter direction.

According to the present invention, when the slave piston is displaced to be in the initial position at which it abuts against the guide piston, brake liquid (brake fluid) enters along the cut-out section, thereby bringing the cut-out section into a state filled with the brake liquid. Subsequently, in the initial position, when the slave piston is about to be displaced in a direction in which it gets away from the guide piston, stiction between the slave piston and the guide piston can be avoided and thus the slave piston can be quickly displaced because the brake liquid intervenes between contact surfaces of the slave piston and the guide piston through the cut-out section.

Accordingly, the present invention makes it possible to improve responsivity of the slave piston when it is displaced from the initial position. As a result, the present invention makes it possible to avoid stiction between the slave piston and the guide piston and to eliminate air remaining between the slave piston and the guide piston.

Moreover, the present invention can provide a braking device, wherein a reservoir is arranged in a vertical upper direction of the slave cylinder, and the cut-out section is provided to extend at least in the vertical upper direction with the reservoir as a base point.

According to the present invention, with the cut-out section provided to extend in the vertical upper direction, it is possible to successfully discharge air and improve air-bleeding performance.

Furthermore, the present invention can provide a braking device, wherein a reservoir is arranged in a vertical upper direction of the slave cylinder, and the cut-out section is provided on at least any one of right-and-left both sides which are perpendicular to an axis of the slave piston, with the reservoir as a base point.

According to the present invention, since the cut-out section is provided on any one of the right-and-left both sides which are perpendicular to the axis of the slave piston, with the reservoir as the base point, the cut-out section can be prevented from being blocked even if the slave piston tilts and moves in the vertical upper and lower direction.

Advantageous Effects of the Invention

According to the present invention, a braking device can be obtained that allows avoiding stiction between a slave piston and a guide piston and eliminating air remaining between the slave piston and the guide piston.

BRIEF DESCRIPTION OF DRAWINGS

FIGS. 8A to 8C illustrate a braking device according to another embodiment of the present invention, in which

DESCRIPTION OF EMBODIMENTS

Figure 1:
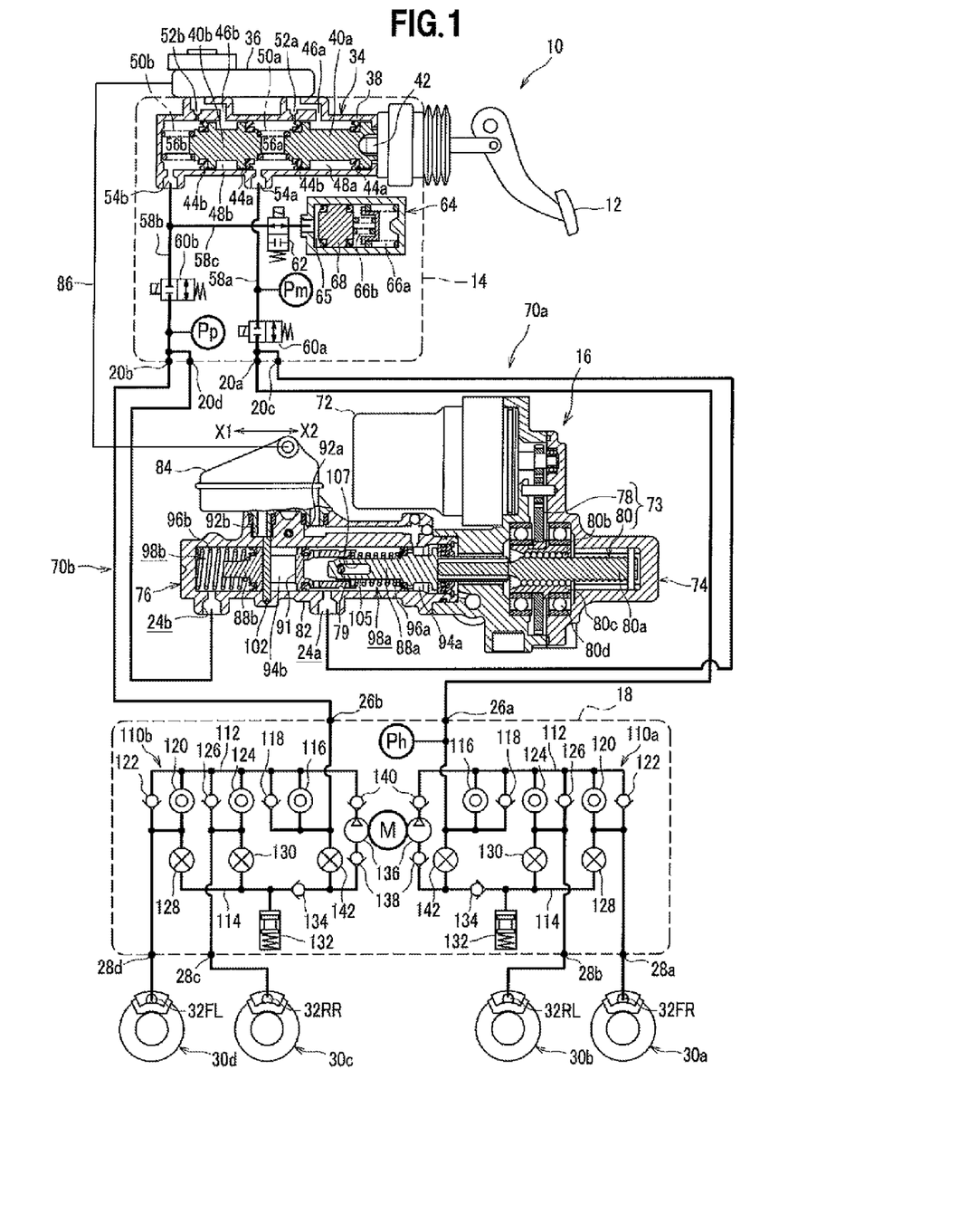
FIG. 1 is a schematic configuration diagram of a brake system for a vehicle into which a braking device according to an embodiment of the present invention is incorporated.

Hereinafter, embodiments of the present invention will be described in detail with reference to the drawings as appropriate. FIG. 1 is a schematic configuration diagram of a brake system for a vehicle into which a braking device according to an embodiment of the present invention is incorporated.

A brake system 10 for a vehicle shown in FIG. 1 is configured to include both a by-wire brake system that transmits an electric signal to actuate a brake, for normal times, and a conventional hydraulic brake system that transmits a hydraulic pressure to actuate a brake, for fail-safe.

Accordingly, as shown in FIG. 1, the brake system 10 for a vehicle is basically configured to include a master cylinder device 14 that, when a brake pedal (brake operation unit) 12 is operated by an operator, inputs the operation, a motor cylinder device 16 that controls a brake hydraulic pressure (second brake hydraulic pressure), and a fluid pressure control device that assists a stability of behavior of the vehicle, as separate devices. Note that the master cylinder device 14 and the motor cylinder device 16 are united to constitute the braking device.

The master cylinder device 14, the motor cylinder device 16 and the fluid pressure control device 18 are connected with one another via a fluid pressure passage formed by a pipe material such as a hose, a tube or the like, and as the by-wire brake system, the master cylinder device 14 and the motor cylinder device 16 are electrically connected with each other via a harness (not shown).

A description will be first given of the fluid pressure passage among these. A connection port 20a of the master cylinder device 14 and a lead-in port 26a of the fluid pressure control device 18 are connected to each other via a piping tube. Moreover, another connection port 20b of the master cylinder device 14 and another lead-in port 26b of the fluid pressure control device 18 are connected to each other via a piping tube.

Moreover, a branch port 20c which communicates with the connection port 20a of the master cylinder device 14 and an output port 24a of the motor cylinder device 16 are connected to each other via a piping tube. Furthermore, a branch port 20d which communicates with the other connection port 20b of the master cylinder device 14 and another output port 24b of the motor cylinder device 16 are connected to each other via a piping tube. Note that in FIG. 1, the output ports 24a, 24b of the motor cylinder device 16 are shown at the bottom part for descriptive purposes, unlike actual positions (see FIG. 2 as described later).

The fluid pressure control device 18 is provided with a plurality of lead-out ports 28a to 28d. The first lead-out port 28a is connected via a piping tube to a wheel cylinder 32FR of a disc brake mechanism 30a which is provided on a right front wheel. The second lead-out port 28b is connected via a piping tube to a wheel cylinder 32RL of a disc brake mechanism 30b which is provided on a left rear wheel. The third lead-out port 28c is connected via a piping tube to a wheel cylinder 32RR of a disc brake mechanism 30c which is provided on a right rear wheel. The fourth lead-out port 28d is connected via a piping tube to a wheel cylinder 32FL of a disc brake mechanism 30d which is provided on a left front wheel.

In this case, brake fluid is supplied via the piping tube connected to each of the lead-out ports 28a to 28d, to each of the wheel cylinders 32FR, 32RL, 32RR, 32FL of the disc brake mechanisms 30a to 30d, and fluid pressure in each of the wheel cylinders 32FR, 32RL, 32RR, 32FL is increased, thereby actuating each of the wheel cylinders 32FR, 32RL, 32RR, 32FL and giving braking force to the corresponding wheel (right front wheel, left rear wheel, right rear wheel, left front wheel).

Note that the brake system 10 for a vehicle is provided so as to be mountable on various vehicles including, for example, a vehicle driven only by an engine (internal combustion engine), a hybrid vehicle, an electric vehicle, a fuel cell vehicle and the like.

The master cylinder device 14 includes a master cylinder 34 of tandem type that can generate a brake hydraulic pressure (first brake hydraulic pressure) by operation of the brake pedal 12 by a driver (operator), and a first reservoir 36 attached to the master cylinder 34. Two pistons 40a, 40b which are spaced at a predetermined distance from each other along an axial direction of a cylinder tube 38 of the master cylinder 34 are provided slidably in the cylinder tube 38. One piston 40a is arranged close to the brake pedal 12 and is coupled via a push rod 42 to the brake pedal 12 to be directly operated. Moreover, the other piston 40b is arranged farther away from the brake pedal 12 than the one piston 40a.

Attached to outer peripheries of the one and other pistons 40a, 40b are a pair of cup seals 44a, 44b via annular step portions, respectively. Formed between the pair of cup seals 44a, 44b are back chambers 48a, 48b which communicate with supply ports 46a, 46b as described later, respectively. Moreover, one spring member 50a is disposed between the one and other pistons 40a, 40b, and another spring member 50b is disposed between the other piston 40b and a side end portion of the cylinder tube 38. Note that the pair of cup seals 44a, 44b may be attached via annular grooves to an inside wall of the cylinder tube 38.

The cylinder tube 38 of the master cylinder 34 is provided with two supply ports 46a, 46b, two relief ports 52a, 52b, and two output ports 54a, 54b. In this case, each supply port 46a (46b) and each relief port 52a (52b) are provided to join together, respectively, and to communicate with a reservoir chamber (not shown) in the first reservoir 36.

Moreover, provided in the cylinder tube 38 of the master cylinder 34 are a first pressure chamber 56b and a second pressure chamber 56a that generate a brake hydraulic pressure corresponding to a pedal effort on the brake pedal 12 by the driver. The first pressure chamber 56b is provided to communicate with the connection port 20b via a first fluid pressure passage 58b, and the second pressure chamber 56a is provided to communicate with the connection port 20a via a second fluid pressure passage 58a.

A first shutoff valve 60b composed of a normally-open type solenoid valve is provided between the master cylinder 34 and the connection port 20b and in the upstream side of the first fluid pressure passage 58b, and a pressure sensor Pp is provided in the downstream side of the first fluid pressure passage 58b. The pressure sensor Pp is adapted to detect a fluid pressure in the downstream side which is closer to the wheel cylinders 32FR, 32RL, 32RR, 32FL, than the first shutoff valve 60b on the first fluid pressure passage 58b.

A pressure sensor Pm is provided between the master cylinder 34 and the connection port 20a and in the upstream side of the second fluid pressure passage 58a, and a second shutoff valve 60a composed of a normally-open type solenoid valve is provided in the downstream side of the second fluid pressure passage 58a. The pressure sensor Pm is adapted to detect a fluid pressure in the upstream side which is closer to the master cylinder 34, than the second shutoff valve 60a on the second fluid pressure passage 58a.

The "normally-open" in the first shutoff valve 60b and the second shutoff valve 60a means a valve configured so that the normal position (position of a valve element when not energized) becomes an open-position state (normally open). Note that in FIG. 1, the first shutoff valve 60b and the second shutoff valve 60a show the valve-closed state, respectively, in which the solenoid is energized to actuate the valve element (not shown).

A branch fluid pressure passage 58c branching from the first fluid pressure passage 58b is provided in the first fluid pressure passage 58b between the master cylinder 34 and the first shutoff valve 60b, and in the branch fluid pressure passage 58c, a third shutoff valve 62 composed of a normally-closed type solenoid valve, and a stroke simulator 64, are connected in series with each other. The "normally-closed" in the third shutoff valve 62 means a valve configured so that the normal position (position of a valve element when not energized) becomes a closed-position state (normally closed). Note that in FIG. 1, the third shutoff valve 62 shows the valve-open state in which the solenoid is energized to actuate the valve element (not shown).

The stroke simulator 64 is a device that generates a stroke and reaction force of the brake at the time of by-wire control to make the operator feel as if the pedal effort generates braking force, and is arranged on the first fluid pressure passage 58b, closer to the master cylinder 34 than the first shutoff valve 60b. The stroke simulator 64 is provided with a fluid pressure chamber 65 communicating with the branch fluid pressure passage 58c, thereby allowing brake fluid which is led-out from the first pressure chamber 56b of the master cylinder 34, to be absorbed via the fluid pressure chamber 65.

Moreover, the stroke simulator 64 is provided with a first return spring 66a with a greater spring constant and a second return spring 66b with a smaller spring constant which are arranged in series with each other, and a simulator piston 68 which is urged by the first and second return springs 66a, 66b, and is disposed to make a pedal feeling of the brake pedal 12 the same as in the existing master cylinder.

The fluid pressure passage is constituted, roughly classified, by a first fluid pressure system 70b that connects the first pressure chamber 56b of the master cylinder 34 with a plurality of wheel cylinders 32RR, 32FL, and a second fluid pressure system 70a that connects the second pressure chamber 56a of the master cylinder 34 with a plurality of wheel cylinders 32FR, 32RL.

The first fluid pressure system 70b includes the first fluid pressure passage 58b which connects the output port 54b of the master cylinder 34 (cylinder tube 38) in the master cylinder device 14 to the connection port 20b, the piping tube which connects the connection port 20b of the master cylinder device 14 to the lead-in port 26b of the fluid pressure control device 18, the piping tube which connects the branch port 20d of the master cylinder device 14 to the output port 24b of the motor cylinder device 16, and the piping tubes which connect the lead-out ports 28c, 28d of the fluid pressure control device 18 to the wheel cylinders 32RR, 32FL, respectively.

The second fluid pressure system 70a includes the second fluid pressure passage 58a which connects the output port 54a of the master cylinder 34 (cylinder tube 38) in the master cylinder device 14 to the connection port 20a, the piping tube which connects the connection port 20a of the master cylinder device 14 to the lead-in port 26a of the fluid pressure control device 18, the piping tube which connects the branch port 20c of the master cylinder device 14 to the output port 24a of the motor cylinder device 16, and the piping tubes which connect the lead-out ports 28a, 28b of the fluid pressure control device 18 to the wheel cylinders 32FR, 32RL, respectively.

As a result, the fluid pressure passage is constituted by the first fluid pressure system 70b and the second fluid pressure system 70a, thereby making it possible to cause the wheel cylinders 32RR, 32FL and the wheel cylinders 32FR, 32RL to operate independently, respectively, and to generate braking force independently of each other.

Figure 2:
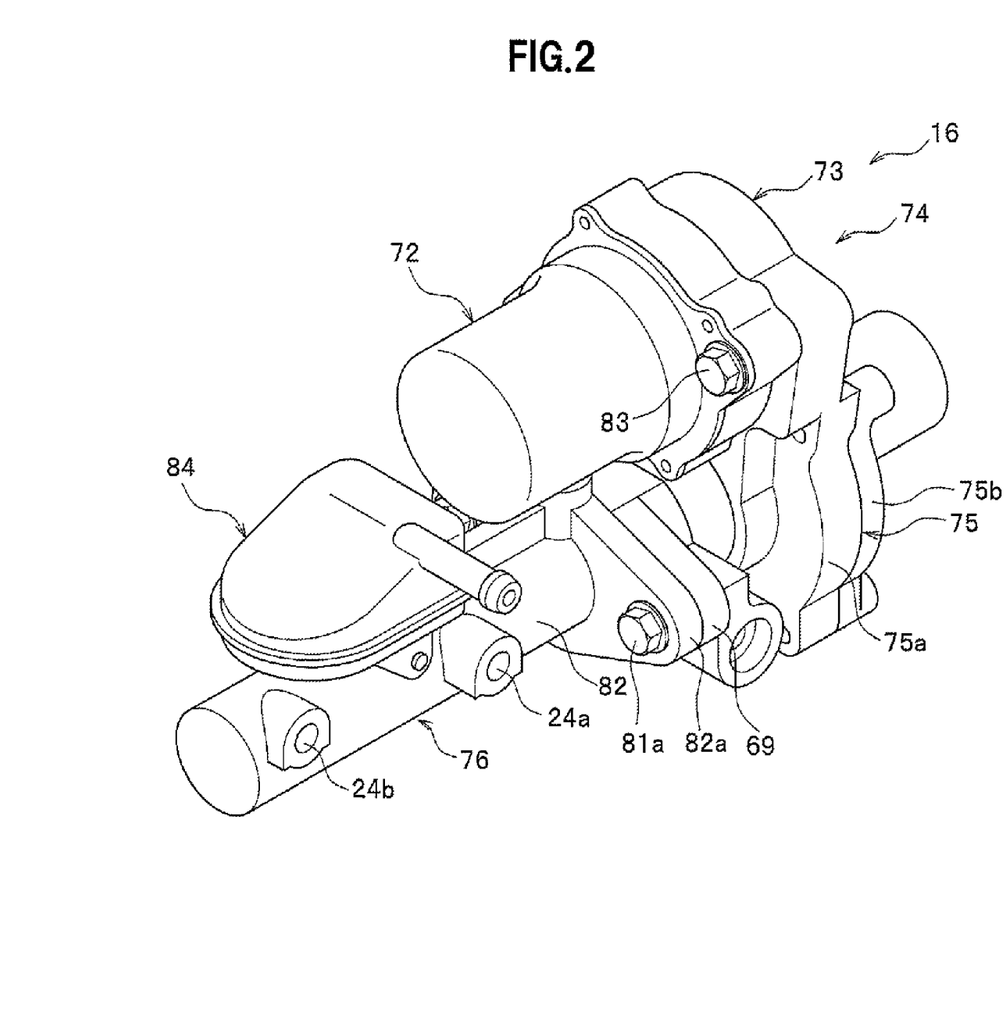
FIG. 2 is a perspective view of a motor cylinder device shown in FIG. 1.

FIG. 2 is a perspective view of the motor cylinder device shown in FIG. 1.

As shown in FIG. 2, the motor cylinder device 16 is provided with an actuator mechanism 74 having an electric motor 72 and a driving force transmission unit 73, and a cylinder mechanism 76 which is urged by the actuator mechanism 74. In this case, the electric motor 72, the driving force transmission unit 73 and the cylinder mechanism 76 are provided to be separable, respectively.

Moreover, the driving force transmission unit 73 of the actuator mechanism 74 includes a gear mechanism (speed reduction mechanism) 78 (see FIG. 1) which transmits a rotary driving force of the electric motor 72, and a ball screw structure (conversion mechanism) 80 (see FIG. 1) which converts the rotary driving force into a linear movement (axial force in the linear direction) to transmit the converted force to first and second slave pistons 88b, 88a as described later, of the cylinder mechanism 76.

The electric motor 72 is composed of, for example, a servo motor which is driven and controlled based on a control signal (electric signal) from a control unit (not shown), and is arranged above the actuator mechanism 74. By this configuration, it is possible to appropriately avoid oil constituent such as grease in the driving force transmission unit 73 from entering the electric motor 72 by the action of gravity. Note that the electric motor 72 is fixed via a screw member 83 to an actuator housing 75 described below.

The driving force transmission unit 73 has the actuator housing 75, and mechanical components for driving force transmission, such as the gear mechanism (speed reduction mechanism) 78, the ball screw structure (conversion mechanism) 80 and the like, are housed in the space inside the actuator housing 75. As shown in FIG. 2, the actuator housing 75 is divided into and constituted by a first body 75*a* which is arranged on the side of the cylinder mechanism 76, and a second body 75*b* which blocks an open end of the first body 75*a*, on the side opposite to the cylinder mechanism 76.

As shown in FIG. 2, a flange portion 69 is provided on an end portion of the first body 75*a*, on the side of the cylinder mechanism 76, and the flange portion 69 is provided with a pair of screw holes (not shown) for attachment of the cylinder mechanism 76. In this case, a pair of screw members 81*a*, which passes through a flange portion 82*a* provided on an end portion of a cylinder body 82 as described later, are screwed into the screw holes, thereby integrally coupling the cylinder mechanism 76 and the driving force transmission unit 73.

As shown in FIG. 1, the ball screw structure 80 is provided with a ball screw shaft (rod) 80*a* which abuts at one end portion along an axial direction thereof against the second slave piston 88*a* of the cylinder mechanism 76, a plurality of balls 80*b* which roll along a spiral thread groove formed on the outer periphery of the ball screw shaft 80*a*, a nearly cylindrical nut member 80*c* which is fitted in a ring gear of the gear mechanism 78 to integrally rotate with the ring gear and is engaged with the balls 80*b*, and a pair of ball bearings 80*d* which rotatably support one end side and another end side along an axial direction of the nut member 80*c*, respectively. Note that the nut member 80*c* is fixed, for example, by press-fit, on the bore surface of the ring gear of the gear mechanism 78.

By thus configuring the driving force transmission unit 73, the rotary driving force of the electric motor 72 which is transmitted via the gear mechanism 78 is inputted to the nut member 80*c* and then converted by the ball screw structure 80 into the axial force in the linear direction (linear movement), thereby moving the ball screw shaft 80*a* forward and backward along the axial direction.

Figure 3:
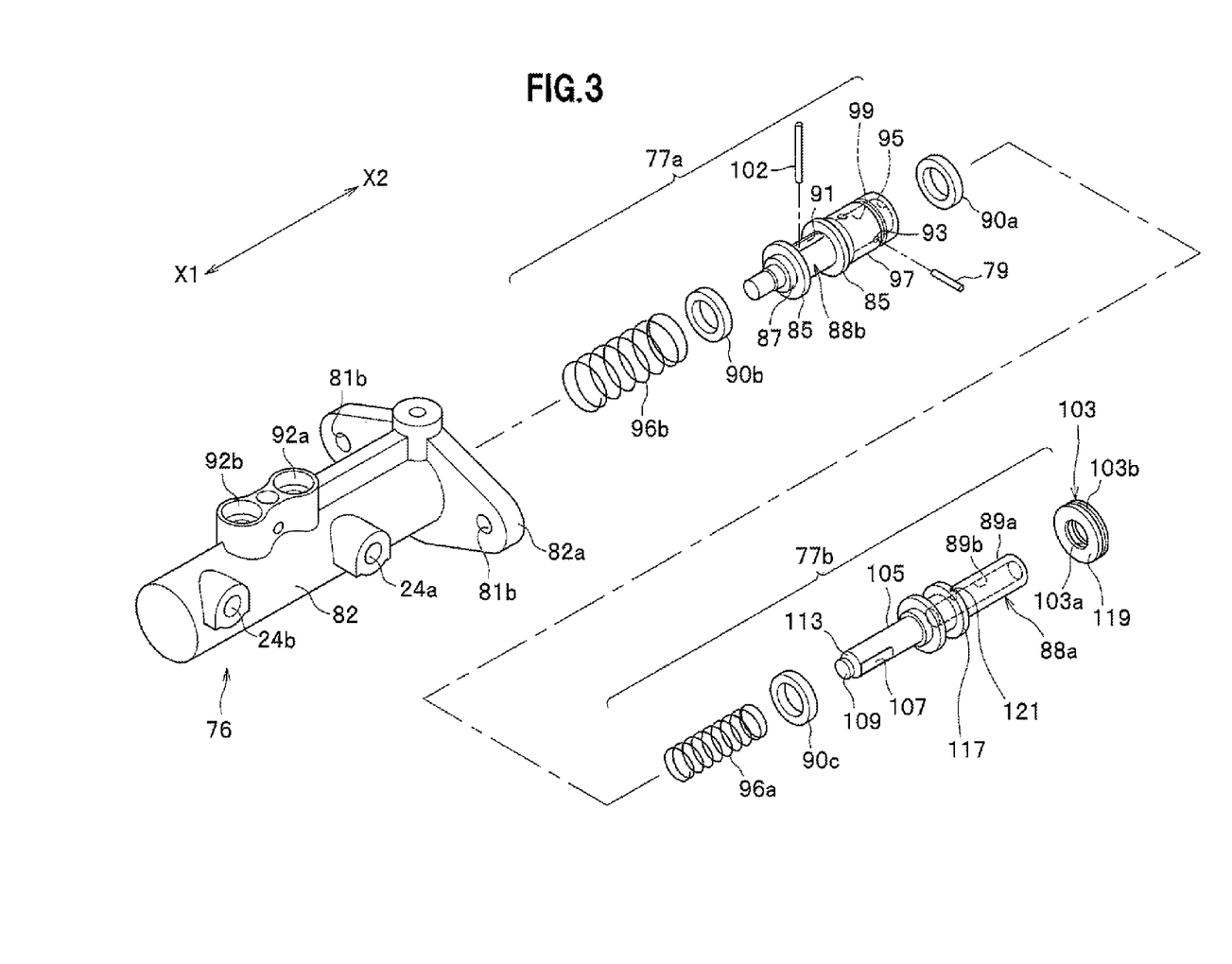
FIG. 3 is an exploded perspective view of a cylinder mechanism.
Figure 4:
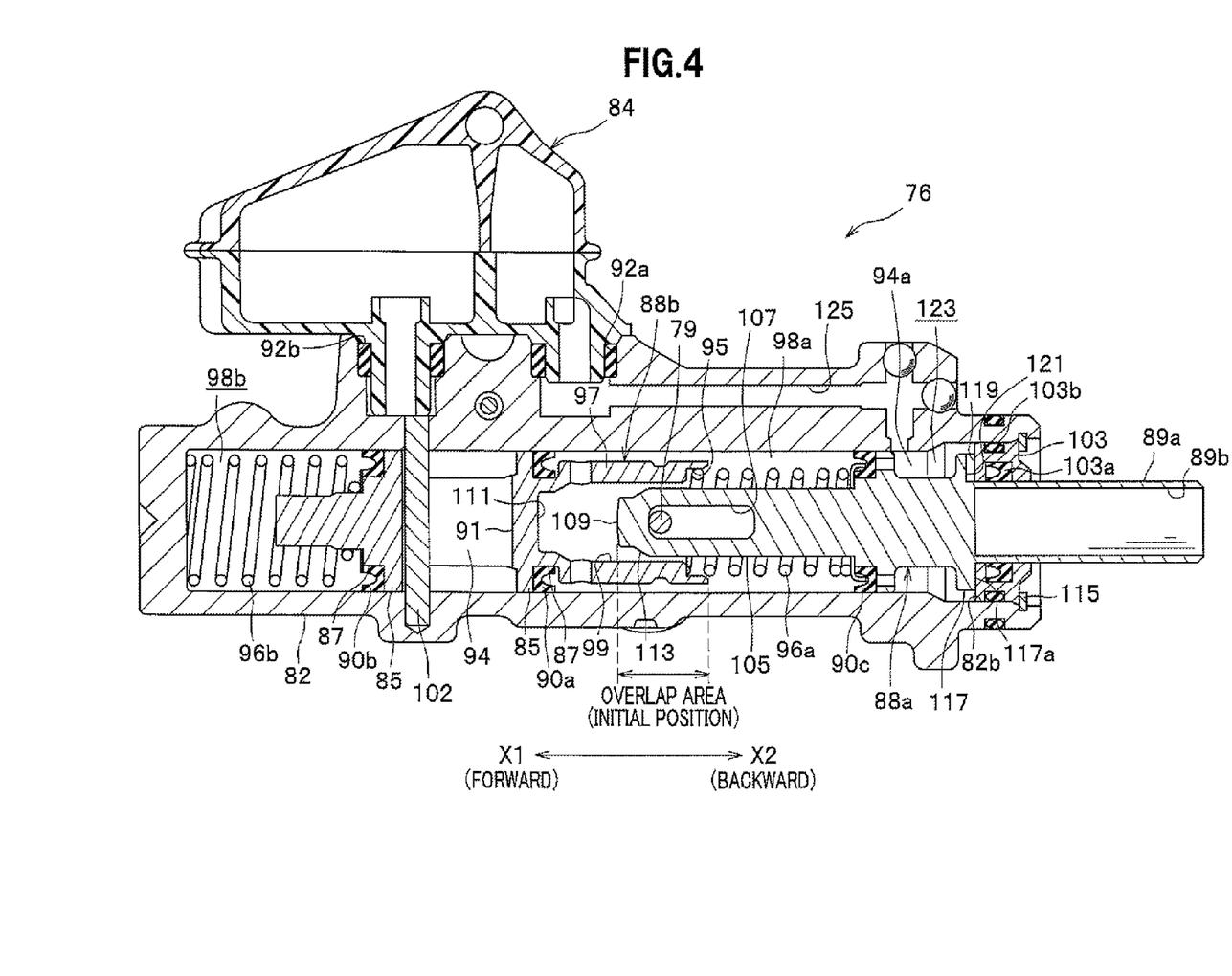
FIG. 4 is a vertical cross-sectional view along an axial direction of the cylinder mechanism.
Figure 5A:
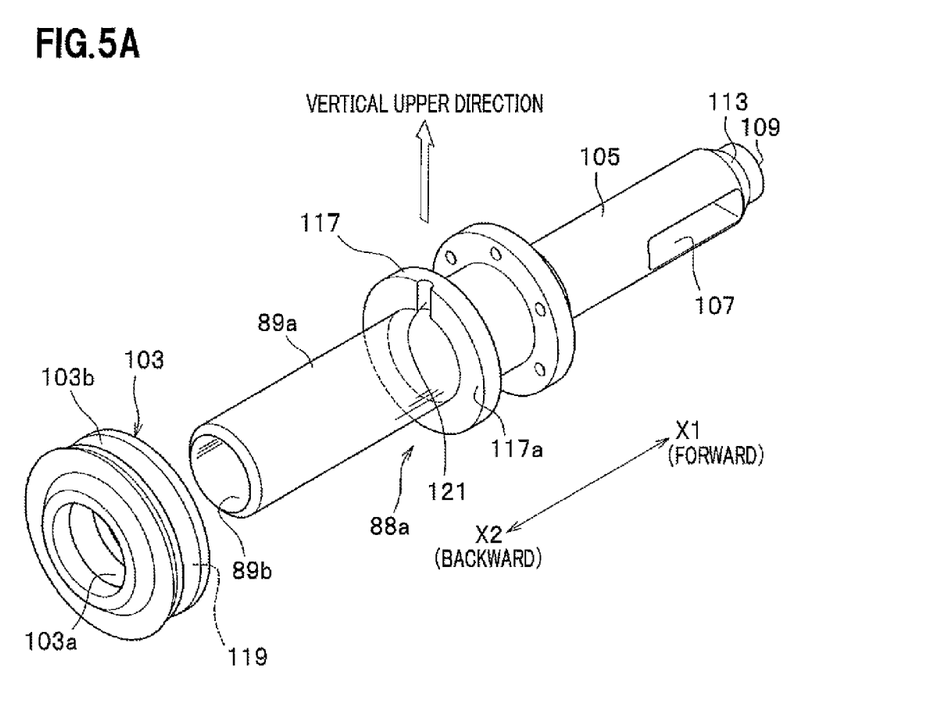
FIG. 5A is an exploded perspective view of a second slave piston and a guide piston.
Figure 5B:
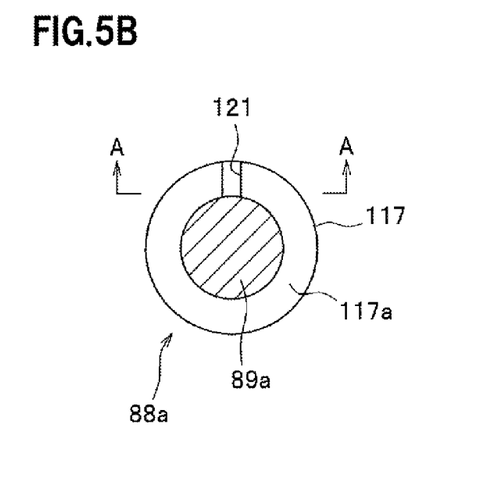
FIG. 5B is a vertical cross-sectional view in a direction perpendicular to the axis of the second slave piston.
Figure 5C:
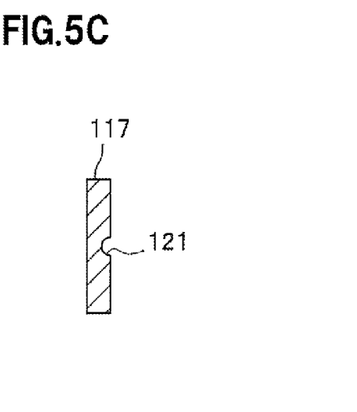
FIG. 5C is a vertical cross-sectional view along the A-A line in FIG. 5B.
Figure 6A:
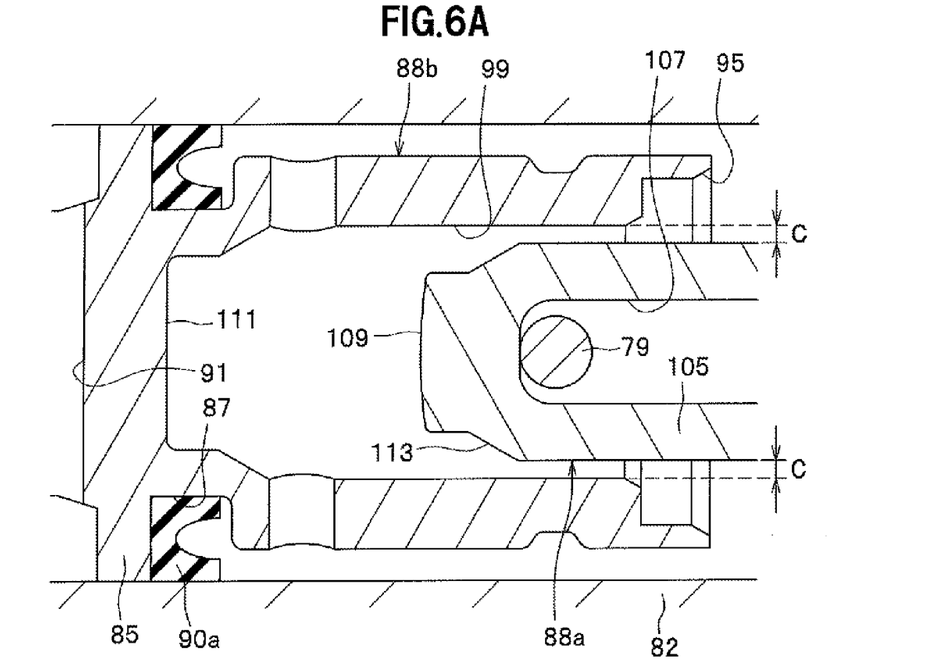
FIG. 6A is an enlarged vertical cross-sectional view showing, at an initial position, a clearance between an inner periphery of a recessed section in an opening section of a first slave piston and an outer periphery of one end portion of a second slave piston.
Figure 6B:
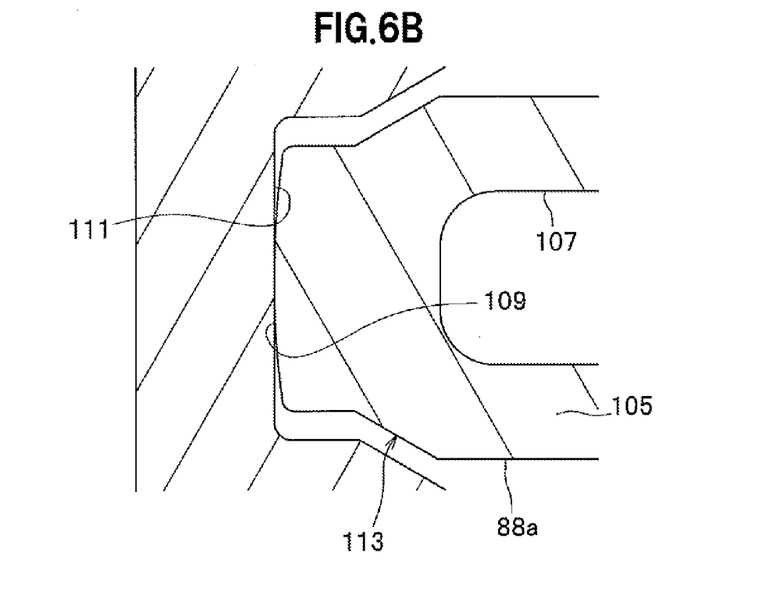
FIG. 6B is an enlarged vertical cross-sectional view showing a state in which a partial spherical surface formed on the second slave piston abuts against an innermost inside wall in the opening section of the first slave piston.

FIG. 3 is an exploded perspective view of the cylinder mechanism; FIG. 4 is a vertical cross-sectional view along the axial direction of the cylinder mechanism; FIG. 5A is an exploded perspective view of the second slave piston and the guide piston; FIG. 5B is a vertical cross-sectional view in a direction perpendicular to the axis of the second slave piston; FIG. 5C is a vertical cross-sectional view along the A-A line in FIG. 5B; FIG. 6A is an enlarged vertical cross-sectional view showing, at an initial position, a clearance between the inner periphery of a recessed section in an opening section of the first slave piston and the outer periphery of one end portion of the second slave piston; and FIG. 6B is an enlarged vertical cross-sectional view showing a state in which a partial spherical surface formed on the second slave piston abuts against an innermost inside wall in the opening section of the first slave piston.

The motor cylinder device 16 transmits the driving force of the electric motor 72 via the driving force transmission unit 73 to the first slave piston 88*b* and the second slave piston 88*a* and causes the first slave piston 88*b* and the second slave piston 88*a* to be forwardly driven, thereby generating the brake hydraulic pressure (second brake hydraulic pressure). Note that in the description below, the description will be given with displacement of the first slave piston 88*b* and the second slave piston 88*a* toward the direction of an arrow mark X1, as "forward movement", and with displacement toward the direction of an arrow mark X2 as "backward movement". Moreover, in some cases, the arrow mark X1 indicates "forward" and the arrow mark X2 indicates "backward".

The cylinder mechanism (cylinder) 76 includes the cylinder body 82 of a cylindrical shape having a bottom, and a second reservoir 84 attached to the cylinder body 82, wherein two pistons (the first slave piston 88*b* and the second slave piston 88*a*) are arranged in tandem in series within the cylinder body 82. The second reservoir 84 is provided to be connected via a piping tube 86 to the first reservoir 36 attached to the master cylinder 34 of the master cylinder device 14, so as to supply brake fluid accumulated in the first reservoir 36 via the piping tube 86 to the second reservoir 84 (see FIG. 1).

Moreover, as shown in FIG. 3, the cylinder mechanism 76 is provided with a first piston mechanism 77*a* which is constituted by assembling the first slave piston 88*b* and peripheral components integrally, and a second piston mechanism 77*b* which is constituted by assembling the second slave piston 88*a* and peripheral components integrally. The first piston mechanism 77*a* and the second piston mechanism 77*b* are assembled integrally and constituted so that parts thereof overlap with each other through a connection pin 79 as described later.

The first piston mechanism 77*a* includes the first slave piston 88*b* which is disposed toward a first fluid pressure chamber 98*b* in the forward of the cylinder body 82; a stopper pin 102 which is engaged with a through-hole 91 formed in a middle section of the first slave piston 88*b* and regulates a moving range of the first slave piston 88*b*; a pair of cup seals 90*a*, 90*b* which abut against annular flange portions 85 in the forward and the backward of the first slave piston 88*b*, with the through-hole 91 therebetween, and are attached to annular step portions 87 continuing to the annular flange portions 85, respectively; and a first spring 96*b* which is disposed between the first slave piston 88*b* and a side end portion (bottom wall) of the cylinder body 82 to push the first slave piston 88*b* toward the backward (direction of the arrow mark X2).

The cup seal 90*a* is a seal member which is arranged in nearly the center along the axial direction of the first slave piston 88*b*, to have both a seal function in sliding contact with the inside wall of the cylinder body 82, and a support function of supporting the first slave piston 88*b* (see FIG. 4). This point will be described in detail later.

Provided on the backward side of the first slave piston 88*b* is a cylinder portion 97 with bottom having an opening section 95 of a nearly circular shape. Part of one side along the axial direction of the second slave piston 88*a* is inserted into a recessed section 99 of the cylinder portion 97 with bottom, to constitute an overlap area between the first slave piston 88*b* and the second slave piston 88*a* (see FIG. 4). Moreover, formed in the cylinder portion 97 with bottom is an insertion hole 93 into which the connection pin 79 is inserted and which passes through the cylinder portion 97 with bottom in a direction perpendicular to the axial direction.

The second piston mechanism 77*b* includes the second slave piston 88*a* which is disposed toward a second fluid pressure chamber 98*a* in the backward (direction of the arrow mark X2) of the first slave piston 88*b*; a guide piston 103 which surrounds and seals the outer periphery of a rod portion 89a in the backward of the second slave piston 88a and linearly guides the second slave piston 88a; a cup seal (first seal member) 90c which is attached to a shaft section 105 in the forward of the second slave piston 88a; and a second spring (elastic member) 96a which is arranged between the first slave piston 88b and the second slave piston 88a and urges the first slave piston 88b and the second slave piston 88a in the direction away from each other.

Formed in the shaft section 105 in the forward of the second slave piston 88a is the long hole 107 into which the connection pin 79 passing through the insertion hole 93 of the first slave piston 88b is inserted. The long hole 107 is formed to extend along the axial direction of the second slave piston 88a and formed to pass through the second slave piston 88a in a direction perpendicular to the axial direction. Moreover, formed inside the rod portion 89a in the backward of the second slave piston 88a is an insertion hole 89b against which one end portion of the ball screw shaft 80a abuts. The connection pin 79 which is inserted into the long hole 107 regulates a clearance between the first slave piston 88b and the second slave piston 88a and regulates the initial position of the second slave piston 88a.

Moreover, the second slave piston 88a includes a disk-shaped enlarged diameter section 117 with its diameter increasing outwardly in a radial direction, at an intermediate section between the shaft section 105 in the forward and the rod portion 89a in the backward along the axial direction. When the second slave piston 88a is in the initial position as shown in FIG. 4, the enlarged diameter section 117 abuts against an axial-direction surface 119 (see FIG. 3) of the guide piston 103. As shown in FIG. 5A, a cut-out section 121 which extends in an internal diameter direction of the second slave piston 88a is provided on an abutting surface 117a of the enlarged diameter section 117 which abuts against the axial-direction surface 119 of the guide piston 103. Note that the axial-direction surface 119 of the guide piston 103 means a flat annular surface which abuts against the enlarged diameter section 117 of the second slave piston 88a (see FIG. 3).

More specifically, the cut-out section 121 is provided such that an end portion thereof on the internal diameter side reaches an outer periphery of the rod portion 89a and an end portion thereof on the external diameter side reaches an outer circumferential edge of the enlarged diameter section 117 (see FIG. 5B). This cut-out section 121 is provided to extend linearly along the vertical upper direction of the slave cylinder body 82.

By providing the cut-out section 121 which extends in the vertical upper direction, it is possible to successfully discharge air and improve air-bleeding performance, and also to use the cut-out section 121 as a reference when connecting the first piston mechanism 77a with the second piston mechanism 77b to assemble integrally with the cylinder mechanism 76. For example, it is possible to easily perceive the insertion direction when the stopper pin 102 is inserted into the through-hole 91.

Moreover, the cut-out section 121 is formed to extend linearly in the vertical upper direction along the radial direction of the enlarged diameter section 117 in FIG. 5A, but it may be formed with slant intersecting with the radial direction and in a non-linear arrangement. Moreover, the cut-out section 121 may be provided at a position slightly deviated from a direction perpendicular to the axis of the second slave piston 88a. Furthermore, although the present embodiment illustrates the shape of the cut-out section 121 which is arc-shaped in cross-section as shown in FIGS. 5B and 5C, the shape of the cut-out section 121 is not limited to this, but may be any one of, for example, rectangle-shaped in cross-section, V-shaped in cross-section, or these composite shapes.

As shown in FIG. 4, attached to an opening section 82b of the cylinder body 82 is the guide piston 103 via a circlip 115. Provided on the inner periphery of the guide piston 103 is a seal member 103a which surrounds and seals the outer periphery of the rod portion 89a of the second slave piston 88a, and the rod portion 89a of the second slave piston 88a is caused to slide along the seal member 103a, thereby making it possible to linearly guide the second slave piston 88a which abuts against the one end portion of the ball screw shaft 80a. Moreover, attached to the outer periphery of the guide piston 103 is a seal member (second seal member) 103b via an annular groove. This seal member 103b seals in contact with the inner periphery of the opening section 82b of the cylinder body 82.

A chamber 123 is formed to be blocked between the cup seal 90c attached to the outer periphery of the second slave piston 88a and the seal member 103b attached to the outer periphery of the guide piston 103. This chamber 123 is provided to communicate through a communication passage 125 with the inside of the second reservoir 84. Accordingly, brake fluid filled in the second reservoir 84 is introduced through the communication passage 125 into the chamber 123, and the side wall 117a of the enlarged diameter section 117 of the second slave piston 88a functions as a pressure-receiving surface of brake fluid. Moreover, the cut-out section 121 of the enlarged diameter section 117 of the second slave piston 88a is filled with the brake liquid introduced into the chamber 123 (see FIG. 7 as described later).

As shown in FIG. 6A, a predetermined clearance C is formed between the inner periphery of the recessed section 99 in the opening section 95 of the first slave piston 88b and the outer periphery of the shaft section 105 of the second slave piston 88a a part of which is disposed inside the recessed section 99 in the opening section 95. When the second slave piston 88a is in the initial position, the clearance C is ensured by the support function of the cup seal 90a which is attached to the outer periphery of nearly the center in the axial direction of the first slave piston 88b.

Moreover, as shown in FIG. 6B, a tip surface (end surface of one end portion) of the shaft section 105 of the second slave piston 88a is formed to be a partial spherical surface 109, and abuts against an innermost inside wall 111 in the opening section 95 of the first slave piston 88b. Provided in the outer periphery of the one end portion of the shaft section 105 of the second slave piston 88a is a tapered surface 113 where the diameter gradually decreases toward the partial spherical surface 109.

Note that, the second slave piston 88a is arranged close to the ball screw structure 80 and provided to abut against the one end portion of the ball screw shaft 80a via the insertion hole 89b, so as to be displaced integrally with the ball screw shaft 80a in the direction of the arrow mark X1, or in the direction of the arrow mark X2. Moreover, the first slave piston 88b is arranged farther away from the ball screw structure 80 than the second slave piston 88a.

Formed on outer peripheries of the first and second slave pistons 88b, 88a are a first back chamber 94b and a second back chamber 94a, respectively, which communicate with reservoir ports 92a, 92b as described later, respectively (see FIG. 1).

Provided on the cylinder body 82 of the cylinder mechanism 76 are two reservoir ports 92a, 92b and two output ports 24a, 24b. In this case, the reservoir port 92a (92b) is provided to communicate with a reservoir chamber (not shown) in the second reservoir 84.

Moreover, provided in the cylinder body 82 are a first fluid pressure chamber 98b that controls a brake hydraulic pressure to be outputted from the output port 24b to the wheel cylinders 32RR, 32FL, and a second fluid pressure chamber 98a that controls a brake hydraulic pressure to be outputted from the output port 24a to the wheel cylinders 32FR, 32RL.

Provided in the first slave piston 88b is the stopper pin 102 which is engaged with the through-hole 91 passing through in the direction nearly perpendicular to the axis of the first slave piston 88b and regulates a sliding range of the first slave piston 88b to inhibit over-return to the side of the second slave piston 88a. The stopper pin 102 prevents the other systems from failing when one system fails, particularly at the time of backup when braking with brake hydraulic pressure generated by the master cylinder 34. Note that the stopper pin 102 is inserted from the opening section of the reservoir port 92b and locked in a locking hole formed in the cylinder body 82.

In the present embodiment, the pair of cup seals 90a, 90b are attached to the annular step portions 87 of the first slave piston 88b, respectively, to assemble the first piston mechanism 77a, and then the second slave piston 88a is inserted so that a part of the shaft section 105 thereof, to which the second spring 96a and the cup seal 90c are attached, is inserted to face inside the recessed section 99 in the opening section 95 of the first slave piston 88b.

Subsequently, while keeping the state where the part (part of one side) of the shaft section 105 of the second slave piston 88a overlaps inside the recessed section 99 in the opening section 95 of the first slave piston 88b, the connection pin 79 is inserted from the outside to pass through the insertion hole 93 of the first slave piston 88b and the long hole 107 of the second slave piston 88a, thereby making it possible to integrally assemble the first piston mechanism 77a and the second piston mechanism 77b. Note that, after a piston assembly is constructed by the first piston mechanism 77a and the second piston mechanism 77b, the guide piston 103 is coupled to the piston assembly.

Thus, in the present embodiment, since the first slave piston 88b, the second spring 96a and the second slave piston 88a can be assembled and constituted integrally and easily through the connection pin 79, assembly accuracy can be improved.

Referring back to FIG. 1, the fluid pressure control device 18 is composed of known components, and includes a first brake system 110b that controls the first fluid pressure system 70b which is connected to the disc brake mechanisms 30c, 30d (wheel cylinders 32RR, 32FL) for the right rear wheel and the left front wheel, and a second brake system 110a that controls the second fluid pressure system 70a which is connected to the disc brake mechanisms 30a, 30b (wheel cylinders 32FR, 32RL) for the right front wheel and the left rear wheel.

Note that the second brake system 110a may be a fluid pressure system which is connected to disc brake mechanisms provided on the left front wheel and the right front wheel, and the first brake system 110b may be a fluid pressure system which is connected to disc brake mechanisms provided on the left rear wheel and the right rear wheel. Moreover, the second brake system 110a may be a fluid pressure system which is connected to disc brake mechanisms provided on the right front wheel and the right rear wheel on one side of the vehicle body, and the first brake system 110b may be a fluid pressure system which is connected to disc brake mechanisms provided on the left front wheel and the left rear wheel on another side of the vehicle body.

Since the first brake system 110b and the second brake system 110a have the same structure, respectively, the same reference sign is given to the part common to the first brake system 110b and the second brake system 110a, and description of the second brake system 110a will be mainly given and description of the first brake system 110b will be added in parentheses.

The second brake system 110a (the first brake system 110b) includes a first common fluid pressure passage 112 and a second common fluid pressure passage 114 for the wheel cylinders 32FR, 32RL (32RR, 32FL). The fluid pressure control device 18 is provided with a regulator valve 116 composed of a normally-open type solenoid valve which is arranged between the lead-in port 26a and the first common fluid pressure passage 112; a first check valve 118 which is arranged in parallel with the regulator valve 116 and permits distribution of brake fluid from the lead-in port 26a to the first common fluid pressure passage 112 (inhibits distribution of brake fluid from the first common fluid pressure passage 112 to the lead-in port 26a); a first in-valve 120 composed of a normally-open type solenoid valve which is arranged between the first common fluid pressure passage 112 and the first lead-out port 28a; a second check valve 122 which is arranged in parallel with the first in-valve 120 and permits distribution of brake fluid from the first lead-out port 28a to the first common fluid pressure passage 112 (inhibits distribution of brake fluid from the first common fluid pressure passage 112 to the first lead-out port 28a); a second in-valve 124 composed of a normally-open type solenoid valve which is arranged between the first common fluid pressure passage 112 and the second lead-out port 28b; and a third check valve 126 which is arranged in parallel with the second in-valve 124 and permits distribution of brake fluid from the second lead-out port 28b to the first common fluid pressure passage 112 (inhibits distribution of brake fluid from the first common fluid pressure passage 112 to the second lead-out port 28b).

Moreover, the fluid pressure control device 18 is provided with a first out-valve 128 composed of a normally-closed type solenoid valve which is arranged between the first lead-out port 28a and the second common fluid pressure passage 114; a second out-valve 130 composed of a normally-closed type solenoid valve which is arranged between the second lead-out port 28b and the second common fluid pressure passage 114; a reservoir 132 which is connected to the second common fluid pressure passage 114; a fourth check valve 134 which is arranged between the first common fluid pressure passage 112 and the second common fluid pressure passage 114 and permits distribution of brake fluid from the second common fluid pressure passage 114 to the first common fluid pressure passage 112 (inhibits distribution of brake fluid from the first common fluid pressure passage 112 to the second common fluid pressure passage 114); a pump 136 which is arranged between the fourth check valve 134 and the first common fluid pressure passage 112 and supplies the brake fluid from the second common fluid pressure passage 114 to the first common fluid pressure passage 112; a suction valve 138 and a discharge valve 140 which are provided on an inlet side and an outlet side of the pump 136; a motor M which drives the pump 136; and a suction valve 142 composed of a normally-closed type solenoid valve which is arranged between the second common fluid pressure passage 114 and the lead-in port 26a.

Note that in the second brake system 110a, provided on the fluid pressure passage close to the lead-in port 26a is a pressure sensor Ph adapted to detect a brake hydraulic pressure which is outputted from the output port 24a of the motor cylinder device 16 and controlled in the second fluid pressure chamber 98a of the motor cylinder device 16. Detection signals detected by each of the pressure sensors Pm, Pp, Ph are inputted to a control unit (not shown). Moreover, the fluid pressure control device 18 performs not only VSA control, but also ABS control.

The brake system 10 for a vehicle into which the braking device according to the present embodiment is incorporated is basically configured as described above, and the operation and advantageous effects thereof will be described below.

At normal times when the brake system 10 for a vehicle normally functions, the first shutoff valve 60b and the second shutoff valve 60a composed of normally-open type solenoid valves are excited by energization to be brought into the valve-closed state, and the third shutoff valve 62 composed of a normally-closed type solenoid valve is excited by energization to be brought into the valve-open state. Therefore, since the first fluid pressure system 70b and the second fluid pressure system 70a are blocked by the first shutoff valve 60b and the second shutoff valve 60a, the brake hydraulic pressure (first brake hydraulic pressure) generated by the master cylinder 34 of the master cylinder device 14 is never transmitted to the wheel cylinders 32FR, 32RL, 32RR, 32FL of the disc brake mechanisms 30a to 30d.

At this time, the brake hydraulic pressure generated in the first pressure chamber 56b of the master cylinder 34 is transmitted via the branch fluid pressure passage 58c and the third shutoff valve 62 which is in the valve-open state, to the fluid pressure chamber 65 of the stroke simulator 64. The brake hydraulic pressure supplied to the fluid pressure chamber 65 causes the simulator piston 68 to displace against spring force of the spring members 66a, 66b, thereby allowing a stroke of the brake pedal 12 and generating a pseudo pedal reaction force to give it to the brake pedal 12. As a result, a brake feeling can be obtained that is free of a sense of discomfort to the driver.

In such a state of the system, when detecting depression of the brake pedal 12 by the driver, the control unit (not shown) causes the electric motor 72 of the motor cylinder device 16 to be driven to urge the actuator mechanism 74, and causes the first slave piston 88b and the second slave piston 88a to displace (move forward) against spring forces of the first return spring 96b and the second return spring 96a, toward the direction of the arrow mark X1 in FIG. 1. By the displacements of the first slave piston 88b and the second slave piston 88a, the brake hydraulic pressures in the first fluid pressure chamber 98b and the second fluid pressure chamber 98a are pressurized so as to be balanced with each other, to generate an intended brake hydraulic pressure (second brake hydraulic pressure).

The brake hydraulic pressures in the first fluid pressure chamber 98b and the second fluid pressure chamber 98a in the motor cylinder device 16 are transmitted via the first and second in-valves 120, 124 which are in the valve-open state in the fluid pressure control device 18, to the wheel cylinders 32FR, 32RL, 32RR, 32FL of the disc brake mechanisms 30a to 30d, and the wheel cylinders 32FR, 32RL, 32RR, 32FL are actuated to give an intended braking force to each wheel.

That is to say, in the brake system 10 for a vehicle according to the present embodiment, at normal times when the motor cylinder device 16 which functions as a power fluid pressure source, an ECU (not shown) which performs a by-wire control, and the like, become operable, a so-called brake-by-wire brake system becomes active in which the disc brake mechanisms 30a to 30d (wheel cylinders 32FR, 32RL, 32RR, 32FL) are actuated with the brake hydraulic pressure (second brake hydraulic pressure) generated by the motor cylinder device 16 in the state where the first shutoff valve 60b and the second shutoff valve 60a shut off the communication between the master cylinder 34 which generates brake hydraulic pressure in response to depression of the brake pedal 12 by the driver, and the disc brake mechanisms 30a to 30d for braking each of the wheels.

On the other hand, at abnormal times when the motor cylinder device 16 and the like become inoperable, a so-called conventional hydraulic brake system becomes active in which the first shutoff valve 60b and the second shutoff valve 60a are brought into the valve-open state, respectively, and the third shutoff valve 62 is brought into the valve-closed state, and the brake hydraulic pressure (first brake hydraulic pressure) generated by the master cylinder 34 is transmitted to the disc brake mechanisms 30a to 30d (wheel cylinders 32FR, 32RL, 32RR, 32FL) to actuate the disc brake mechanisms 30a to 30d (wheel cylinders 32FR, 32RL, 32RR, 32FL).

Figure 7:
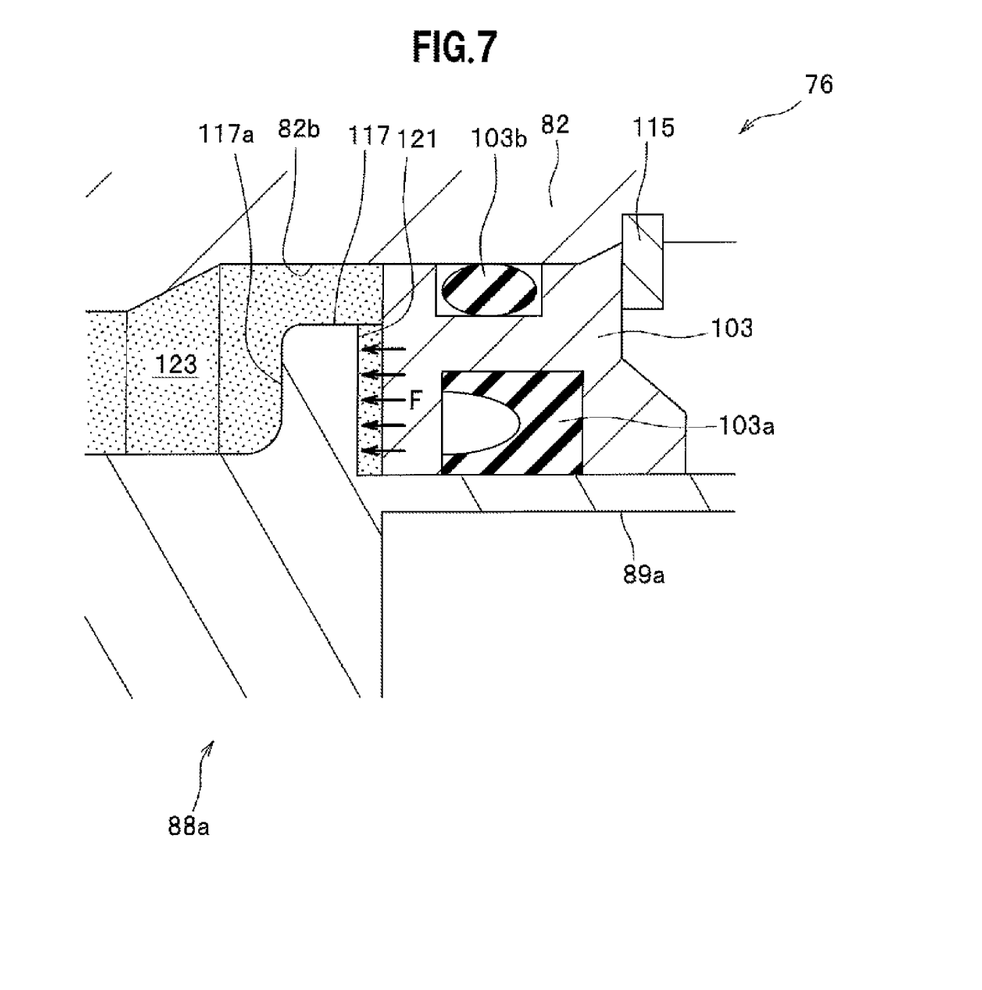
FIG. 7 is an enlarged vertical cross-sectional view showing a state in which after an enlarged diameter section of the second slave piston and the guide piston abut against each other, the enlarged diameter section is about to be displaced away from the guide piston.

FIG. 7 is an enlarged vertical cross-sectional view showing a state in which after an enlarged diameter section of the second slave piston and the guide piston abut against each other, the enlarged diameter section is about to be displaced away from the guide piston.

In the present embodiment, when the second slave piston 88a is displaced to the most backward position to be in the initial position at which it abuts against the guide piston 103 (see FIG. 4), brake liquid (brake fluid) enters along the cut-out section 121, thereby bringing the cut-out section 121 into a state filled with the brake liquid. In this initial position, when the second slave piston 88a is about to be displaced in a direction in which it gets away from the guide piston 103, the brake liquid intervenes between contact surfaces of the second slave piston 88a and the guide piston 103 through the cut-out section 121 and thus force F (see FIG. 7) is applied to the enlarged diameter section 117 of the second slave piston 88a. Consequently, stiction between the second slave piston 88a and the guide piston 103 can be avoided and thus the second slave piston 88a can be quickly displaced.

Accordingly, the present embodiment makes it possible to improve responsivity of the second slave piston 88a when it is displaced from the initial position. As a result, the present embodiment makes it possible to appropriately avoid stiction between the second slave piston 88a and the guide piston 103 and to eliminate air remaining between the second slave piston 88a and the guide piston 103.

Moreover, the present embodiment makes it possible, with the cut-out section 121 provided to extend in the vertical upper direction with the reservoir 84 as the base point, to successfully discharge air and improve air-bleeding performance.

Next, a description will be given of a braking device according to another embodiment of the present invention.

Figure 8A:
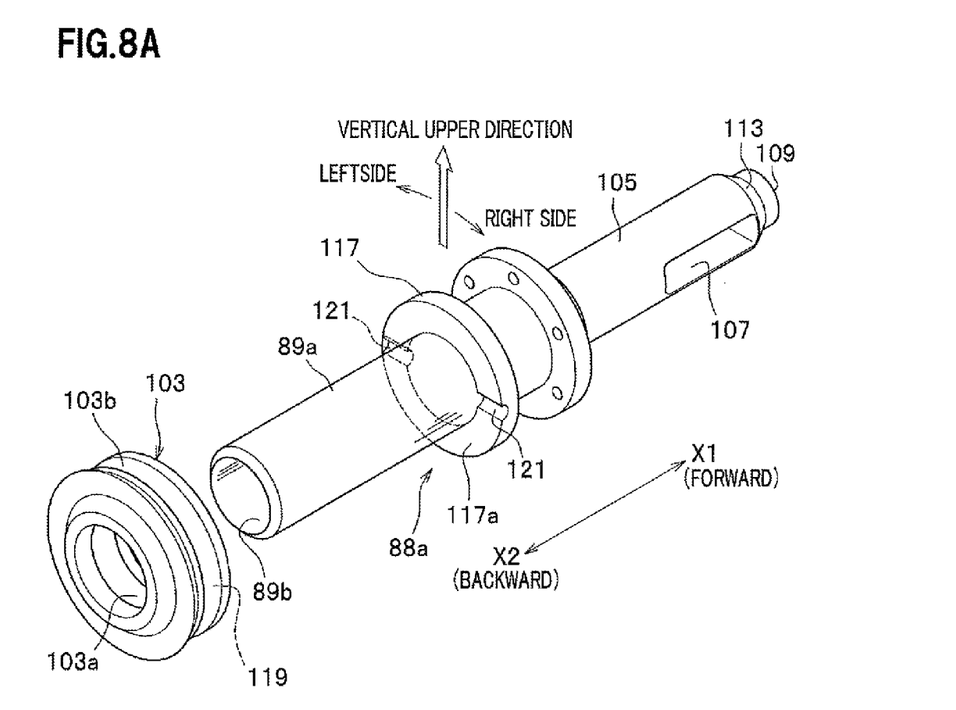
FIG. 8A is an exploded perspective view of a second slave piston and a guide piston.
Figure 8B:
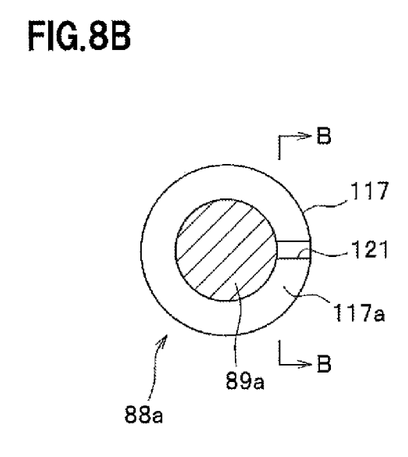
FIG. 8B is a vertical cross-sectional view in a direction perpendicular to the axis of the second slave piston.
Figure 8C:
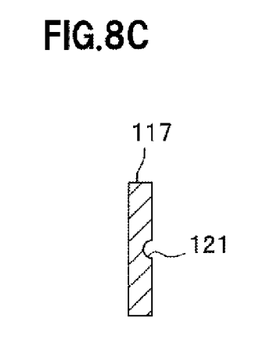
FIG. 8C is a vertical cross-sectional view along the B-B line in FIG. 8B.

FIGS. 8A to 8C illustrate a braking device according to another embodiment of the present invention, in which FIG. 8A is an exploded perspective view of a second slave piston and a guide piston; FIG. 8B is a vertical cross-sectional view in a direction perpendicular to the axis of the second slave piston; and FIG. 8C is a vertical cross-sectional view along the B-B line in FIG. 8B.

In FIG. 8A, a case where the cut-out section 121 is arranged on the right side which is perpendicular to the axis of the second slave piston 88a is represented by a solid line, and a case where the cut-out section 121 is arranged on the left side is represented by a dashed line. In this case, a plurality of the cut-out sections 121 may be provided on either the right side or the left side, or on the both sides, which are perpendicular to the axis of the second slave piston 88a. Moreover, this cut-out section 121 may be arranged in combination with the cut-out section 121 in the vertical upper direction shown in FIG. 5A.

In the other embodiment, since the cut-out section 121 is provided on any one of the right-and-left both sides, or on the both sides, which are perpendicular to the axis of the second slave piston 88a, with the reservoir 84 as the base point, the cut-out section 121 can be prevented from being blocked even if the second slave piston 88a tilts and moves in the vertical upper and lower direction.

Next, a description will be given of a braking device according to still another embodiment of the present invention.

Figure 9:
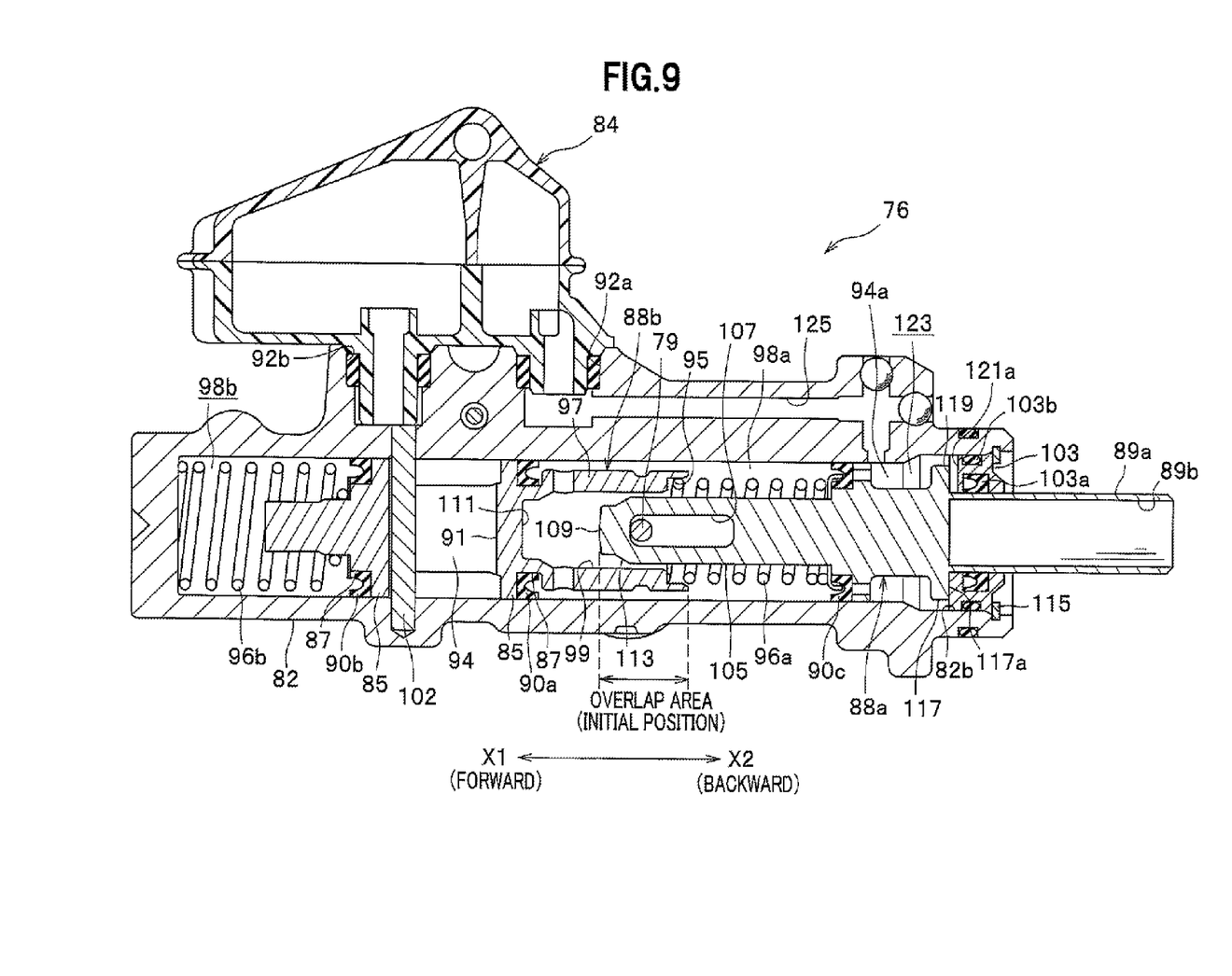
FIG. 9 is a vertical cross-sectional view along the axial direction of a cylinder mechanism which constitutes a braking device according to still another embodiment of the present invention.

FIG. 9 is a vertical cross-sectional view along the axial direction of a cylinder mechanism which constitutes a braking device according to still another embodiment.

In the embodiments shown in FIG. 1 to FIG. 8C described above, the cut-out section 121 is provided on the enlarged diameter section 117 of the second slave piston 88a, but the still another embodiment is different from the above embodiments in that a cut-out section 121a is provided on the axial-direction surface 119 of the guide piston 103 which abuts against the abutting surface 117a of the enlarged diameter section 117. This cut-out section 121a is formed to extend in an internal diameter direction on the axial-direction surface 119 of the guide piston 103. Note that the directions of extension of the cut-out section 121a are the same as those in FIGS. 5A to 5C and FIGS. 8A to 8C, i.e., the cut-out section 121a is linearly provided in the vertical upper direction, or on either the right side or the left side, or on the both sides, which are perpendicular to the axis of the second slave piston 88a. In this case, the abutting surface 117a of the enlarged diameter section 117 of the second slave piston 88a, which abuts against the axial-direction surface 119 of the guide piston 103, is formed by a flat surface. Moreover, in the embodiments shown in FIG. 1 to FIG. 9, a through-hole (not shown) may be provided in place of the cut-out section 121, 121a. Other configurations, operations and advantageous effects for the cut-out section 121a are the same as those in the embodiments described above and thus detailed description thereof will be omitted.

Note that in the present embodiment, another embodiment and still another embodiment, the brake system 10 for a vehicle can be obtained that includes the motor cylinder device 16 which can generate intended brake hydraulic pressures (first and second brake hydraulic pressures) with a simple structure and thus improve assembling performance. The vehicle includes, for example, a four-wheel drive vehicle (4WD), a front-wheel drive vehicle (FF), a rear-wheel drive vehicle (FR), a motorbike, a three-wheeled vehicle and the like.

REFERENCE SIGNS LIST

12 Brake pedal (Brake operation unit)
14 Master cylinder device (Braking device)
16 Motor cylinder device (Braking device)
34 Master cylinder
72 Electric motor
76 Cylinder mechanism (Slave cylinder)
82 Cylinder body (Slave cylinder body)
84 Second reservoir (Reservoir)
88a Second slave piston (Slave piston)
90a Cup seal (First seal member)
95 Opening section
103 Guide piston
103b Seal member (Second seal member)
117 Enlarged diameter portion
119 Axial-direction surface
121, 121a Cut-out section

The invention claimed is:

1. A braking device comprising:
a master cylinder that generates a brake hydraulic pressure by operation of a brake operation unit;
a slave cylinder that displaces a slave piston by an electric motor which is driven in response to operation amount of the brake operation unit and generates a brake hydraulic pressure, and has a slave cylinder body provided with an opening section into which the slave piston can be inserted from outside, the slave cylinder having a top and a bottom in an installed configuration thereof;
a guide piston that blocks the opening section of the slave cylinder body and surrounds an outer periphery of the slave piston, the guide piston being installed in the slave cylinder body in a manner so as to be immovable in an axial direction in relation to the slave cylinder body;
a first seal member that is provided on the slave piston and seals in sliding contact with an inside wall of the slave cylinder body; and
a second seal member that is provided on the guide piston and seals in abutment against the inside wall of the slave cylinder body, wherein
the slave piston includes a rod portion which fits slidably inside of the guide piston, and an enlarged diameter flange portion having an abutting surface which comes into contact with an annular surface of the guide piston when the slave piston is in an initial position, the enlarged diameter flange portion having a diameter larger than a diameter of the rod portion, and
at least one of the abutting surface of the enlarged diameter flange portion of the slave piston and the annular surface of the guide piston is provided with a cut-out section which extends in a radial direction, the cut-out section defining a channel extending between the rod portion and an outer edge of the enlarged diameter flange portion when the slave piston is in the initial position thereof.

2. The braking device according to claim 1, wherein:
a reservoir is arranged proximate the top of the slave cylinder in a vertical upper direction, and
the cut-out section is provided to extend at least in the vertical upper direction in the installed configuration of the slave cylinder.

3. The braking device according to claim 1, wherein:
a reservoir is arranged proximate the top of the slave cylinder in a vertical upper direction, and
the cut-out section is provided on at least one of right-and-left sides of the abutting surface of the enlarged diameter flange portion which are perpendicular to an axis of the slave piston.

4. The braking device according to claim 1, wherein:
a reservoir is arranged proximate the top of the slave cylinder in a vertical upper direction, and the cut-out section is provided to extend in the radial direction on the annular surface of the guide piston.

* * * * *